United States Patent
Marugame

(10) Patent No.: US 8,594,412 B2
(45) Date of Patent: Nov. 26, 2013

(54) PATHOLOGIC IMAGE DIAGNOSTIC SYSTEM, PATHOLOGIC IMAGE DIAGNOSTIC METHOD, AND PATHOLOGIC IMAGE DIAGNOSTIC PROGRAM

(75) Inventor: Atsushi Marugame, Tokyo (JP)

(73) Assignee: NEC Corporation, Tokyo (JP)

( * ) Notice: Subject to any disclaimer, the term of this patent is extended or adjusted under 35 U.S.C. 154(b) by 165 days.

(21) Appl. No.: 13/376,120

(22) PCT Filed: Jun. 1, 2010

(86) PCT No.: PCT/JP2010/059268
§ 371 (c)(1),
(2), (4) Date: Dec. 2, 2011

(87) PCT Pub. No.: WO2010/140588
PCT Pub. Date: Dec. 9, 2010

(65) Prior Publication Data
US 2012/0082366 A1 Apr. 5, 2012

(30) Foreign Application Priority Data
Jun. 3, 2009 (JP) .................. 2009-134219

(51) Int. Cl.
*G06K 9/00* (2006.01)
(52) U.S. Cl.
USPC .......................................................... 382/133
(58) Field of Classification Search
USPC ................ 382/128, 129, 131, 133; 348/80; 250/461.2; 435/1.1
See application file for complete search history.

(56) References Cited

U.S. PATENT DOCUMENTS

| | | | | |
|---|---|---|---|---|
| 6,031,930 A * | 2/2000 | Bacus et al. | ................... | 382/133 |
| 6,246,785 B1 * | 6/2001 | Molnar et al. | ................ | 382/133 |
| 6,535,626 B1 * | 3/2003 | Pressman et al. | ............. | 382/133 |
| 2002/0021828 A1 * | 2/2002 | Papier et al. | ................... | 382/128 |
| 2003/0170703 A1 * | 9/2003 | Piper et al. | ........................ | 435/6 |
| 2004/0202357 A1 * | 10/2004 | Perz et al. | ...................... | 382/128 |
| 2005/0077349 A1 | 4/2005 | Bonalle et al. | | |
| 2005/0254696 A1 * | 11/2005 | Bacus et al. | ................... | 382/128 |
| 2006/0159325 A1 * | 7/2006 | Zeineh et al. | ................. | 382/128 |
| 2007/0031043 A1 * | 2/2007 | Perz et al. | ...................... | 382/225 |
| 2007/0135999 A1 * | 6/2007 | Kolatt | ............................. | 702/19 |
| 2009/0092301 A1 * | 4/2009 | Jerebko et al. | ................ | 382/128 |
| 2009/0141126 A1 * | 6/2009 | Soenksen | ........................ | 348/79 |

FOREIGN PATENT DOCUMENTS

| | | | |
|---|---|---|---|
| JP | 2005-057494 A | 3/2005 |
| JP | 2006-102097 A | 4/2006 |
| JP | 2006-121578 A | 5/2006 |
| JP | 2007-135065 A | 5/2007 |

* cited by examiner

*Primary Examiner* — Shervin Nakhjavan
(74) *Attorney, Agent, or Firm* — Sughrue Mion, PLLC

(57) ABSTRACT

Pathologic tissue images are to be output which allow effective image diagnosis to be performed. There are included an index amount calculating unit that divides a captured pathologic image into a predetermined divisional areas and sets a measurement index value related to a reference of pathologic diagnosis for each divisional area; and a significance calculating module that sets, for each divisional area, a significance related to the pathologic measurement on the basis of both the measurement index value of each divisional area and the measurement index value of a respective divisional area adjacent to that divisional area. The significance calculating module extracts that one of the divisional areas in which the areas for which images of the living tissues have been captured represent a given percentage, and further the significance calculating module associates, with the extracted divisional area, the measurement index value and significance set therefor for transmission.

9 Claims, 12 Drawing Sheets

FIG.5

|    | I  | U |
|----|----|---|
| KU | A  | E |
| KI | KA | O |

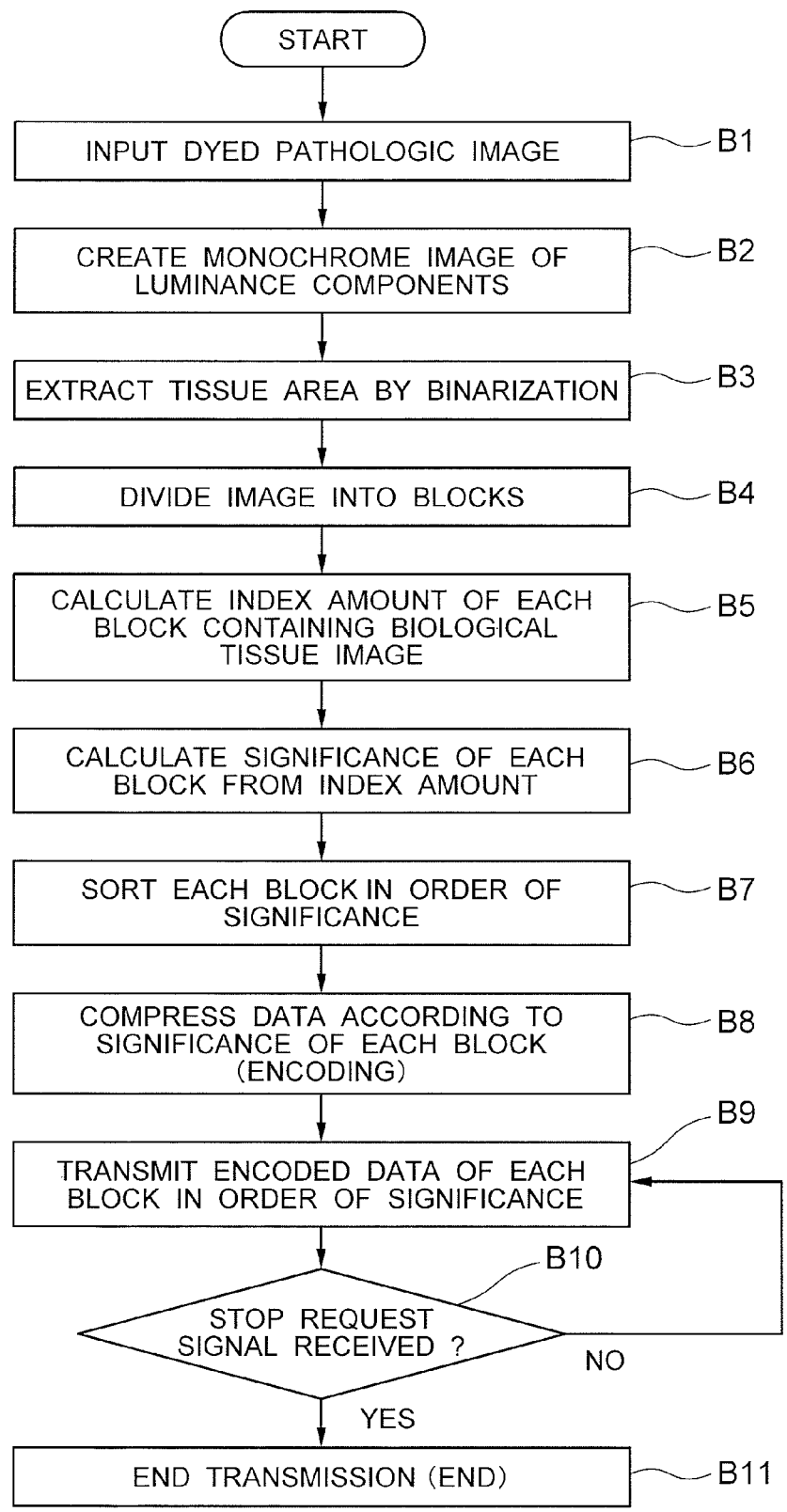

PATHOLOGIC IMAGE DIAGNOSTIC SYSTEM, PATHOLOGIC IMAGE DIAGNOSTIC METHOD, AND PATHOLOGIC IMAGE DIAGNOSTIC PROGRAM

CROSS REFERENCE TO RELATED APPLICATIONS

This application is a National Stage of International Application No. PCT/JP2010/059268 filed Jun. 1, 2010, claiming priority based on Japanese Patent Application No. 2009-134219 filed Jun. 3, 2009 the contents of all of which are incorporated herein by reference in their entirety.

TECHNICAL FIELD

The present invention relates to a pathologic image diagnostic system which outputs a pathologic tissue image as a target of a pathologic diagnosis, a pathologic image diagnostic method, and a pathologic image diagnostic program.

BACKGROUND ART

A pathologic diagnosis is generally done by a pathologist through looking at a preparation on a slide glass under a microscope. However, the view field of a microscope is limited, so that it is necessary to examine every nook and corner of the preparation by changing the examining areas in order to examine it thoroughly. For this, used instead of the microscope is an image scanner of a type which captures the slide as an electronic image.

In that case, at the maximum, it is the resolution of a monitor of PC (personal computer) which corresponds to the view field of the microscope. However, unless the tissue is small and the magnification at the time of display is small, the entire area size of the tissue becomes several tens or several hundreds of times of the resolution of the monitor of the PC.

With pathologic diagnoses, diagnosis results are not necessarily decided according to the entire tissue. The diagnosis results are influenced by a partial area of a tissue image in many cases.

Further, different aspects may be observed in areas distant from the tissue. Thus, it is efficient to divide the tissue into areas of a specific segment and to perform processing for diagnosis, so that the processing can be stopped at the point where the diagnosis result is decided.

Therefore, to divide a biological (pathologic) tissue image on which a biological tissue is captured into rectangular blocks and to diagnose each block is disclosed in a method disclosed in Japanese Unexamined Patent Publication Hei 06-003601, for example.

Further, in a case where an electronic image is transmitted via a communication, e.g., a case of conducting a telediagnosis, dividing a pathologic tissue image into rectangular pieces is often considered in terms of a transmission efficiency.

However, the processing efficiency is limited when a diagnosis is done by simply dividing a pathologic tissue image as the diagnosis target of a pathologic analysis into rectangular pieces and diagnosing each of the divided rectangular image pieces by a mechanical procedure and order (e.g., from upper left to lower right).

Further, for example, relations regarding a focused divisional area as a diagnosis target within a pathologic tissue image and neighboring areas that are neighboring to the focused divisional area vertically, laterally, etc., are considered important in an image diagnosis in some cases. Thus, as described above, in a case where a detailed diagnosis is conducted in a mechanical order, not only the diagnosis efficiency is poor but also information acquired from the area over different blocks and acquired from the entire image is overlooked.

As a related technique thereof, disclosed is a method which employs a transmitter-side and a receiver-side image communication devices, in which the transmitter-side image communication device sets the priority for each of divided images acquired by dividing an original image, and conducts transmission/reception of each of the divided images while increasing the image data amount of the divided image with a high priority to be large and reducing the image data amount of the divided image with a low priority to be small, thereby conducting an image communication with high transmission efficiency (Patent Document 1).

Further, as a related technique thereof, disclosed is a method which sets the priority for each of divided images acquired by dividing a captured eyeground image and sets the order for displaying each of the divided images based on the priority so as to shorten the diagnosis time (Patent Document 2).

Furthermore, as a related technique thereof, disclosed is a method which sets an index showing the significance for each of a large number of pieces of image data and adds the value of the index every time a processing work for each of the image data is executed so as to make it easy to select the image data of a high utility value (Patent Document 3).

Patent Document 1: Japanese Unexamined Patent Publication 2005-057494
Patent Document 2: Japanese Unexamined Patent Publication 2006-102097
Patent Document 3: Japanese Unexamined Patent Publication 2007-135065
Patent Document 4: Japanese Unexamined Patent Publication 2006-121578

However, as described above, different aspects may sometimes be observed between the tissue areas of distant parts within the pathologic tissue image. Therefore, with the related information disclosed in Patent Documents 1, 2, and 3, it is possible that the information acquired from the entire image is overlooked.

Further, for example, relations regarding a focused divisional area as a diagnosis target within a pathologic tissue image and neighboring areas that are neighboring to the focused divisional area vertically, laterally, etc., are considered important in an image diagnosis in some cases. Therefore, with the methods such as the related techniques disclosed in Patent Documents 1, 2, and 3 which allot the index values to each of the divided images, the image diagnosis efficiency becomes poor.

Further, in a case where it is required to transmit a pathologic tissue image by a communication for a telediagnosis or the like, there is a possibility of having a situation where the diagnosis cannot be done until the transmission of the part (image area) important for the diagnosis is completed. In the meantime, there is also a possibility of having a situation where it is required to wait for the image area that is not required to conduct a detailed diagnosis, i.e., the image area that is not highly important. Therefore, the entire pathologic diagnosis efficiency becomes poor.

It is an object of the present invention to provide a pathologic image diagnostic system which outputs a pathologic tissue image, a pathologic image diagnostic method, and a pathologic image diagnostic program, which make it possible to improve the inconveniences of the related techniques and to conduct the image diagnosis efficiently.

DISCLOSURE OF THE INVENTION

In order to achieve the foregoing object, the pathologic image diagnostic system according to the present invention is characterized to include: a measurement index setting module which divides a pathologic image where a biological tissue is captured into preset divisional areas and sets preset measurement index values regarding a reference of a pathologic diagnosis for each of the divisional areas; a significance setting module which sets a significance regarding a pathologic measurement to each of the divisional areas based on the measurement index values of each of the divisional areas and the measurement index values of the divisional areas neighboring to each of the measurement areas; a divisional area extracting module which extracts the divisional area in which an area of captured biological tissue occupies a specific proportion from the divisional areas and transmits the divisional area by associating it with the measurement index values and the divisional significance; and a divisional area output/display module which outputs/displays the pathologic image constituted with the transmitted divisional area.

Further, the pathologic image diagnostic method according to the present invention is characterized to include: dividing a pathologic image where a biological tissue is captured into preset divisional areas and setting preset measurement index values regarding a reference of a pathologic diagnosis for each of the divisional areas; setting a significance regarding a pathologic measurement to each of the divisional areas based on the measurement index values of each of the divisional areas and the measurement index values of the divisional areas neighboring to each of the measurement areas; extracting the divisional area in which an area of captured biological tissue occupies a specific proportion from the divisional areas and transmitting the divisional area by associating it with the measurement index values and the divisional significance; and outputting/displaying the pathologic image constituted with the transmitted divisional area.

Furthermore, the community pathologic image managing program according to the present invention is characterized to cause a preset computer to execute: a function which divides a pathologic image where a biological tissue is captured into preset divisional areas and calculates measurement index values regarding a reference of a pathologic diagnosis for each of the divisional areas; a function which sets a significance regarding a pathologic measurement to each of the divisional areas based on the measurement index values of each of the divisional areas and the measurement index values of the divisional areas neighboring to each of the measurement areas; and a function which extracts the divisional area in which an area of captured biological tissue occupies a specific proportion from the divisional areas.

The present invention makes it possible to conduct an image diagnosis efficiently.

BRIEF DESCRIPTION OF THE DRAWINGS

FIG. 5 is an explanatory chart showing a positional relation between a target block and neighboring blocks in the pathological image of the pathologic image diagnostic system disclosed in FIG. 1;

FIG. 12 is a flowchart showing entire operation processing steps of the pathologic image diagnostic system disclosed in FIG. 3.

BEST MODES FOR CARRYING OUT THE INVENTION (First Exemplary Embodiment)

Next, basic structural contents of an exemplary embodiment according to the present invention will be described.

Figure 1:
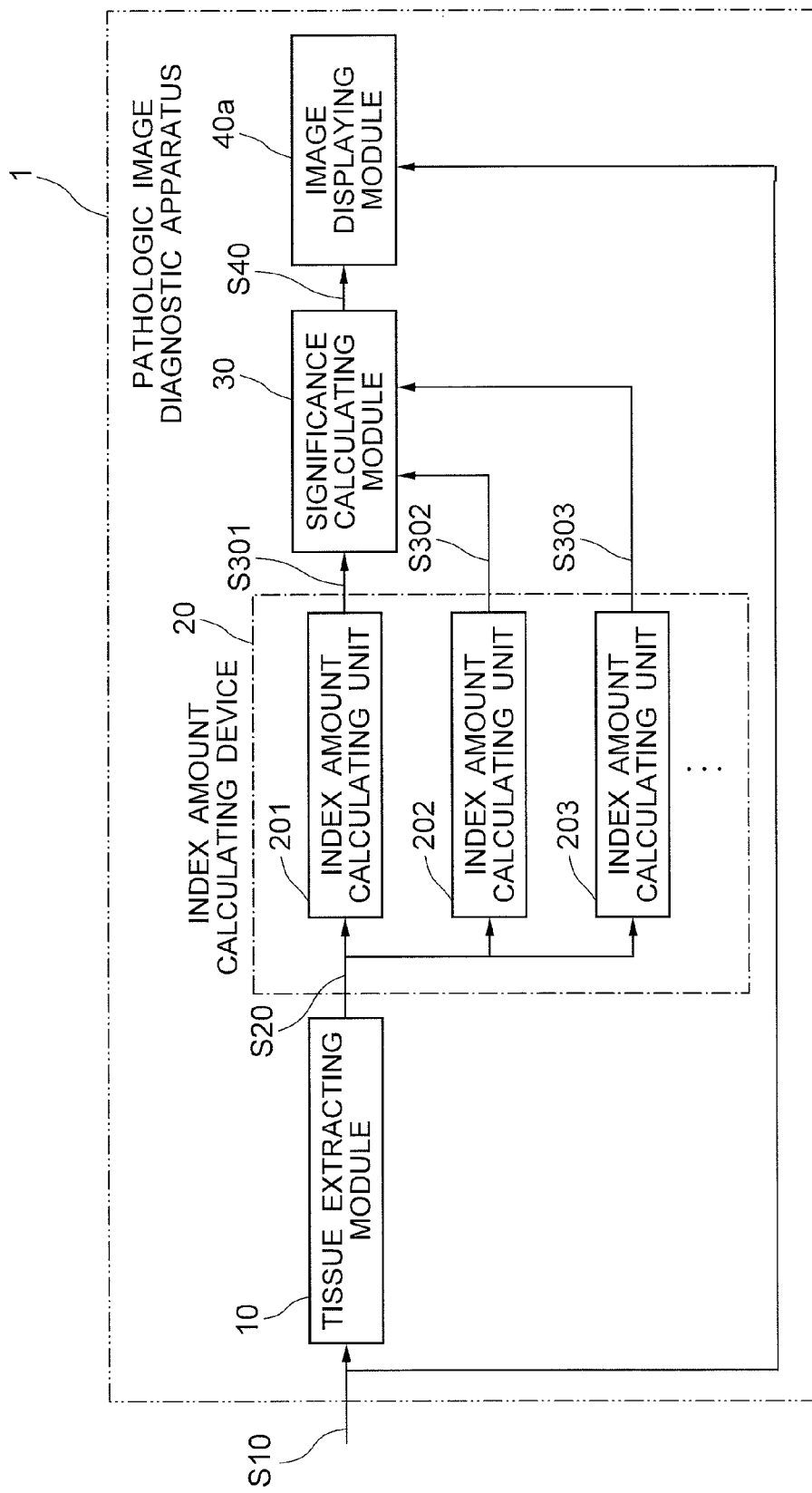
FIG. 1 is a schematic block diagram showing an exemplary embodiment of a pathologic image diagnostic system according to the present invention.

As shown in FIG. 1, a pathologic image diagnostic system 1 of the first exemplary embodiment employs a structure which includes: a tissue extracting module 10 which extracts an image areas (tissue area) with a captured tissue from a pathologic tissue image (S10) sent from outside; an index amount calculating device 20 which receives rectangular blocks S20 that are the image areas extracted by the tissue extracting module 10, and calculates an index amount regarding a preset pathologic tissue for each of the rectangular blocks S20; a significance calculating module 30 which calculates the significance of the index amount of each of the rectangular blocks, and applies an order thereto; and an image displaying module 40a which outputs/displays the rectangular blocks S20 sent from the significance calculating module 30 by associating those to index values S40 and the significances calculated in advance.

This will be described in details hereinafter. The tissue extracting module 10 extracts the tissue area within the pathologic tissue image inputted from outside of the pathologic image diagnostic apparatus 1.

The tissue extracting module 10 detects the tissue area (image area) where the tissue is captured as a dyed area in the pathologic image. Specifically, the tissue extracting module 10 creates a monochrome image of a specific color (or luminance) from the pathologic tissue image, and performs binary processing on the monochrome image by a binary image creating algorithm (e.g., a discriminating/analyzing method (binarization by Otsu) with a threshold value set in advance.

The accuracy for extracting the tissue image is not required to be as minute as a pixel unit at this point, so that the image processing for the pathologic tissue image is executed by a rectangular block unit.

Further, in order to avoid extraction of a block only with a small number of tissue area pixels because of a noise, it is desirable to perform processing for suppressing the noise by utilizing a filter such as a Gaussian filter before executing the binary processing.

Figure 4:
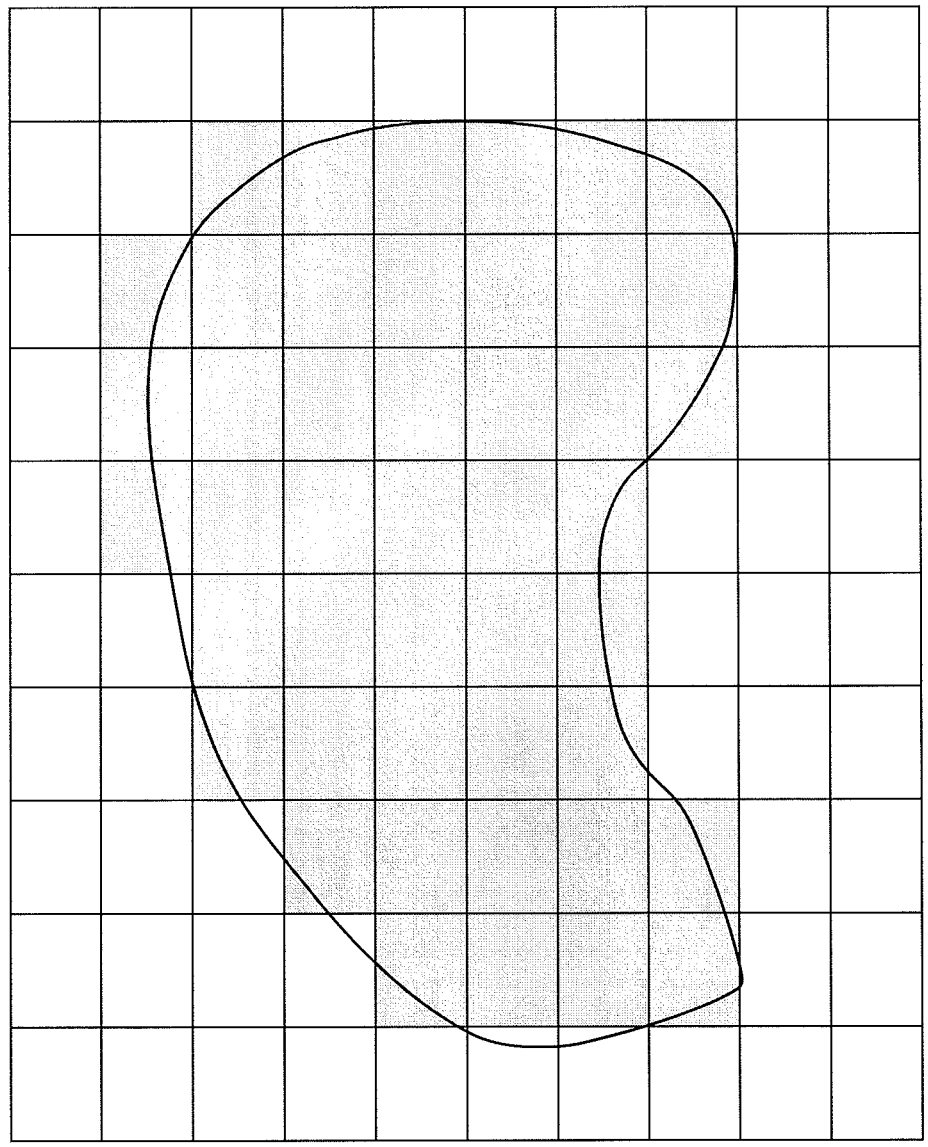
FIG. 4 is an explanatory illustration showing an example of a pathologic image of the pathologic image diagnostic system disclosed in FIG. 1.

Further, as shown in FIG. 4, the tissue extracting module 10 divides the pathologic tissue image S10 into a rectangular mesh, and extracts only a block (rectangular block) containing the tissue area (pixels) of a specific pixel number or more as a processing-target rectangular area.

It is not necessary to actually draw a mesh in the pathologic tissue image. One of vertexes of each of the set rectangular blocks and the vertical and lateral sizes of the rectangular blocks may be stored.

As described above, the index amount calculating module 20 calculates the index amount of the rectangular block S20 extracted by the tissue extracting module 10.

The index amount calculating module 20 includes index calculating units 201, 202, 203, - - - which conduct calculations of the pathologic indexes in concurrent and distributed manners. While the index amount calculating module 20 constituted with the index amount calculating units 201, 202, and 203 is shown in the first exemplary embodiment as a way of example, the number of the used indexes set in the index amount calculating module 20 is not limited only to that.

For the image diagnosis of the pathologic tissue done by a pathologist, often used is a coarse-to-fine search method which first looks at the tissue entirely with a low magnification to find a part where the cell-nucleuses and cytoplasm are dyed in a dark color and a part where a change in the depth of the dyeing is large, and examines each of the cell-nucleuses closely by switching the magnification in the vicinity thereof to a high magnification.

So, in this exemplary embodiment, the pathologic image is divided by the block units as the index amount regarding the pathologic tissue diagnosis, and introduced are: [a] an intra-block index amount for examining global depth of the dying; [b] an inter-block index amount for examining global change in the dying; and [c] an entire block index amount for examining whether the depth and change in dying are caused due to an unnatural reason.

[a] An intra-block index amount is an index amount that can be calculated from information of each pixel constituting a rectangular block.

Used as this index amount is an amount regarding an absolute concentration of a specific color of an area corresponding to anomalous cell-nucleus or a group of anomalous cell-nucleuses generated by a sickness such as an inflammation or a carcinoma and the shape of a chunk of the pixels extracted according to the specific color e.g., moment within a rectangular block, Hu moment, a judging/analyzing threshold value, a specific color pixel number, number of chunks of specific color pixels, an area average, a variance, a length average, a variance, a circular-degree average, a variance, etc.

Further, a processed image may be created by performing signal processing such as Fourier transformation or image processing such as edge extraction filtering on the original pathologic tissue image, and the index amount may be calculated based on moment within a processed image, Hu moment, a judging/analyzing threshold value, a specific color pixel number, number of chunks of specific color pixels, an area average, a variance, a length average, a variance, a circular-degree average, a variance, or the like of the processed image.

Then, among the above-described index amounts, those that are not intuitive will be described. The moment can be acquired by a calculation formula shown in Expression 1 by setting an image luminance value I (x, y) of the image processing target image (here, it is assumed to be a pathologic tissue image) and m, n as the dimensions of the x, y directions.

$$M_{m,n} = \sum_{x,y} I(x, y) x^m y^n \qquad \text{[Expression 1]}$$

Further, one-dimensional Hu moment can also be acquired by Expression 2 where $m_{2,0}$ and $m_{0,2}$ are taken as normalized center moment.

$$H_1 = m_{2,0} + m_{0,2} \qquad \text{[Expression 2]}$$

The circular degree can be acquired by Expression 3 where S is an area and L is a perimeter.

$$4\pi S/L^2 \qquad \text{[Expression 3]}$$

Here, specifically, a HE (hematoxylin-eosin) dyed image as a pathologic tissue image will be investigated. The cell-nucleus part in HE has a character of being dyed in bluish purple by hematoxylin, and the cytoplasm part has a character of being dyed in reddish purple by eosin. In this case, the indexes such as Hu moment of color signals of red, blue, and cyan (light blue) as well as magenta (purple) as complementary colors, the judging/analyzing threshold value, the number of the pixel chunks, and the like are the important indexes for a pathological diagnosis. Thus, in this exemplary embodiment, the index amounts (intra-block index amounts) are calculated from the quantified values of the Hu moment, the judging/analyzing threshold value, and the specific color pixel number, for example.

[b] An inter-block index amount can be acquired by calculating the changing degree of the peripheral blocks with respect to the intra-block index amount described in [a].

This index amount reflects changes between a peripheral area and a periphery of a specific tissue area corresponding to a process of growth of the cell-nucleuses considered important in the pathologic diagnosis, and the Laplacian of a block unit, a variance with respect to the peripheral blocks, or the like is used therefore.

Here, the value of the Laplacian is defined as a value acquired by subtracting a value that is acquired by multiplying the number of neighboring extraction blocks to the index value of the target block from the total value of all the index amounts (index values) of the extraction blocks neighboring to the target block (a of FIG. 5) (Expression 3).

Figure 5:
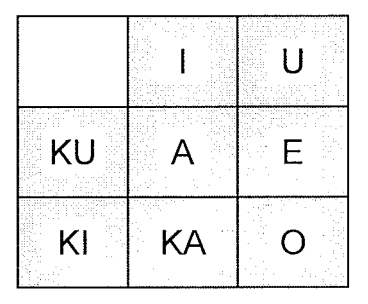

As shown in FIG. 5, the target block (a) has seven neighboring blocks among the neighboring eight adjacent blocks (rectangular blocks in vertical, lateral, and oblique directions), and the Laplacian is calculated based on Expression 4 shown below.

$$(i)+(u)+(e)+(o)+(ka)+(ki)+(ku)-7\times(a) \qquad \text{[Expression 4]}$$

[c] An entire block index amount is a value calculated based on [a] the intra-block variance value, and examples thereof are statistic amounts (an average, a variance, a histogram, etc.) calculated from the index (amounts) values of the rectangular blocks of the entire image.

The entire block index amount is for verifying whether [a] and [b] mentioned above are caused due to a pathological reason or caused due to an unnatural reason irrespective of pathology, and it is irrespective in regards to calculation of the priority of each rectangular block. It is used in an auxiliary manner for giving a warning as an abnormal image generated due to a failure at the time of creating a slide or at the time of capturing the image.

The single calculated index or a plurality of calculated indexes is sent to the significance calculating module 30 as a scalar value or a vector value.

The significance calculating module 30 gives the order to the index amounts that are the scalar values or the vector values annexed to each of the blocks. The significance can be set as follows based on a pathologic diagnostic reason.

In a case of homogeneity of colors in the block, e.g., a case of density or concentration of the cell-nucleuses, there is a more possibility of inflammation or epilepsy when the pixel color value or the density is greater. Thus, the significance becomes higher.

In a case of homogeneity of chunks in the block, e.g., a case of having many large pixel chunks with a high circular degree (large blue circular chunks in a case of HE dyeing), there is a possibility of having cancerous cells. Thus, the significance becomes higher.

In a case of a change with respect to the periphery such as the Laplacian between the blocks, there is a more possibility of being a sickness appeared as an abnormality in a process of growth of the cells when the change amount is larger. Thus, the significance is not high.

In those cases where the significance is calculated as such specific values, the color value, the density, and the like can be used just as they are or may be used by dividing those by a specific range and then giving a ranking thereto.

Other than the relative order (total order), the order can be applied by defining a corresponding relationship with a group in which the order is not necessarily given. Provided that the index is x, the order or the group is y, and the corresponding mapping is f, a following relation is acquired.

$$f: x \rightarrow y \quad \text{[Expression 5]}$$

When the order is the entire order, f becomes a function, and the group y and the mapping (function) f are in a relation shown in Expression 6.

$$y = f(x) \quad \text{[Expression 6]}$$

In a case where the index amount calculating module 20 is constituted with a single index amount calculating unit 201, the index amounts are the scalar values. Thus, the order can be applied simply by the extent of the values.

In a case where the index amount calculating module 20 is constituted with a plurality of index amount calculating units (201, 202, - - -), it is necessary to give the mapping (function).

The way of giving the mapping (function) varies depending on the selection of the index amount and which of the indexes to be considered important. When the significances of the entire indexes are equivalent, it is calculated by the sum total of the entire indexes.

Other than the function expressed by a numerical formula, the function f maybe a mapping belonging to a specific order of a group irrespective or the other indexes when a given index is in specific numerical values.

Further, in a case where data in which the index values and the order (group) are corresponded to each other can be acquired prior to conducting a calculation, f may be set by a mechanical learning such as a neural network or a support vector machine.

After acquiring the order (group) of the entire blocks, the significance calculating module 30 associates the order and the index values to the blocks and sends those to the screen display module 40a.

The image displaying module 40a associates the order of the blocks inputted from the significance calculating module 30 and the rectangular blocks of the original image with the rectangular blocks of the original image, and outputs/displays those on an output device such as a display set in advance.

Figure 6:
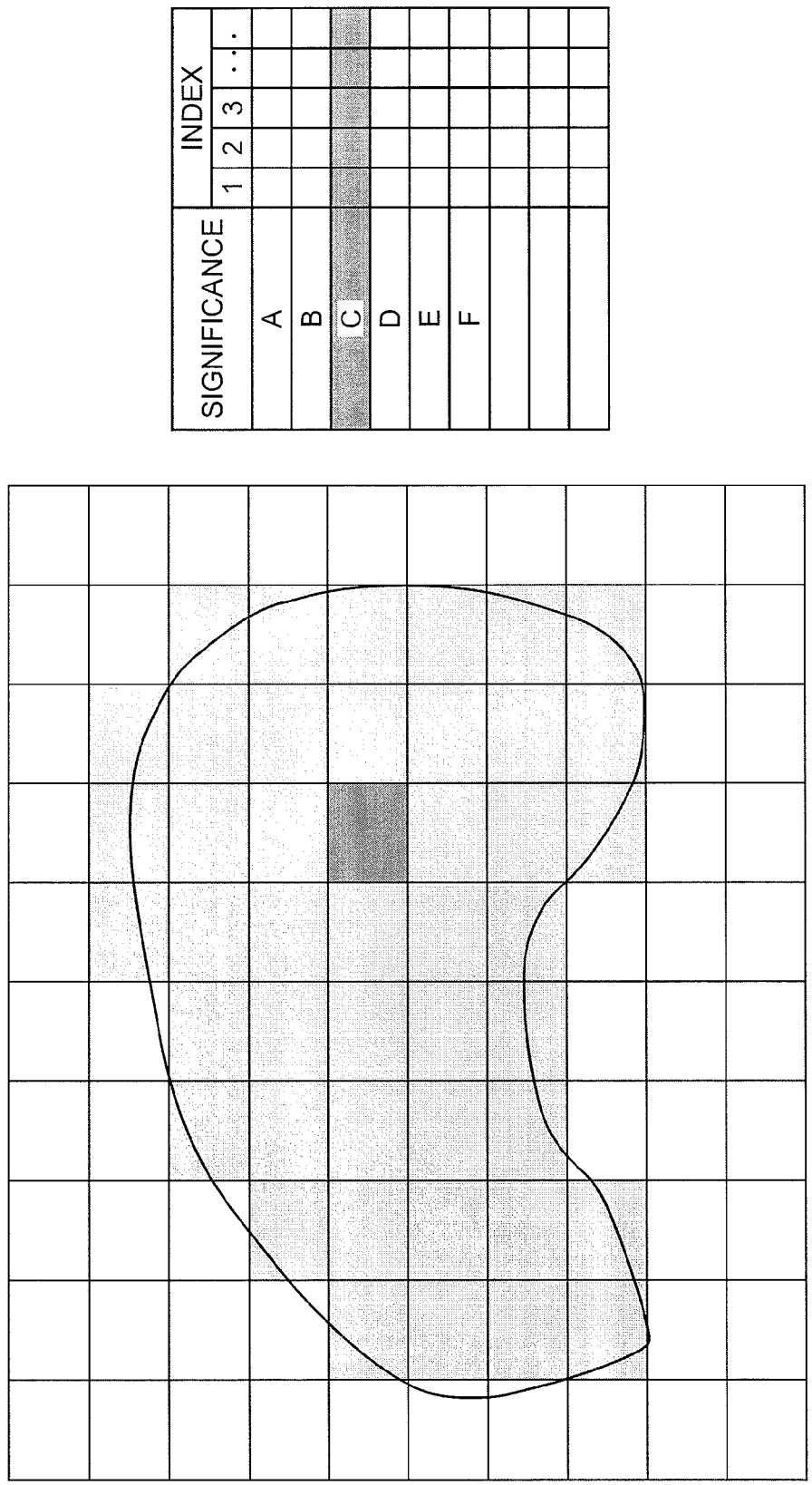
FIG. 6 shows explanatory charts showing a display screen of the pathologic image diagnostic system disclosed in FIG. 1 where the pathologic image is displayed and showing an example of an interface.

Here, examples of the display screen of the pathologic image S10 and the interface are shown in FIG. 6.

In this case, the dark-gray block of the left chart in FIG. 6 is associated with a row of the third significance C from the top of the significance column of the chart on the right side of FIG. 6.

There may be same significances, and there are two in this example, i.e., C and F. Further, a plurality of significances may be set. In that case, it is designed to be able to switch the significance by a menu of the significance.

As described above, with the first exemplary embodiment, it is possible to allot the locally quantified values to the pathologic tissue image by setting and calculating the index amounts (values) regarding the pathologic tissue in each rectangular block (area) set in the pathologic tissue image, and to quantitatively display the original pathologic tissue image according to the significance of the pathologic tissue.

Therefore, the user can know the state of the entire pathologic tissue image quantitatively, so that it is possible to make a pathologic image diagnosis efficiently and promptly. Further, it is possible to shorten the diagnosis time.

Furthermore, with the exemplary embodiment, the significances as the pathologic tissues can be set by giving the index values to each of the set rectangular blocks, so that the pathologically important area grasped over a plurality of blocks including the neighboring blocks can be outputted and displayed in an easily discovered manner.

(Explanation of Action of First Exemplary Embodiment)

Next, the outline of the actions of the pathologic image diagnostic system according to the first exemplary embodiment will be described.

The index amount calculating unit 20 divides the pathologic image of a captured biological tissue into divisional areas set in advance and sets a measurement index value regarding the reference of the pathologic diagnosis for each divisional area (an index amount setting step). Then, the significance calculating module 30 sets, to each of the divisional areas, the significances regarding the pathologic measurement based on the measurement index values of each of the divisional areas and the measurement index values of the divisional areas neighboring to each of the divisional areas (a significance setting step).

Thereafter, the significance calculating module 30 extracts the divisional area in which the area of captured biological tissue occupies a specific proportion thereof from the divisional areas (a tissue area judging/extracting step), and transmits that divisional area by associating it with the measurement index value and the division significance. The image displaying module 40a outputs/displays the pathological image constituted with the divisional area.

Note here that the execution contents of the index amount setting step, the significance setting step, and the tissue area judging/extracting step may be put into a program and may be executed by a computer. The program is recorded onto a recording medium and treated as a target of commercial transactions.

Figure 10:
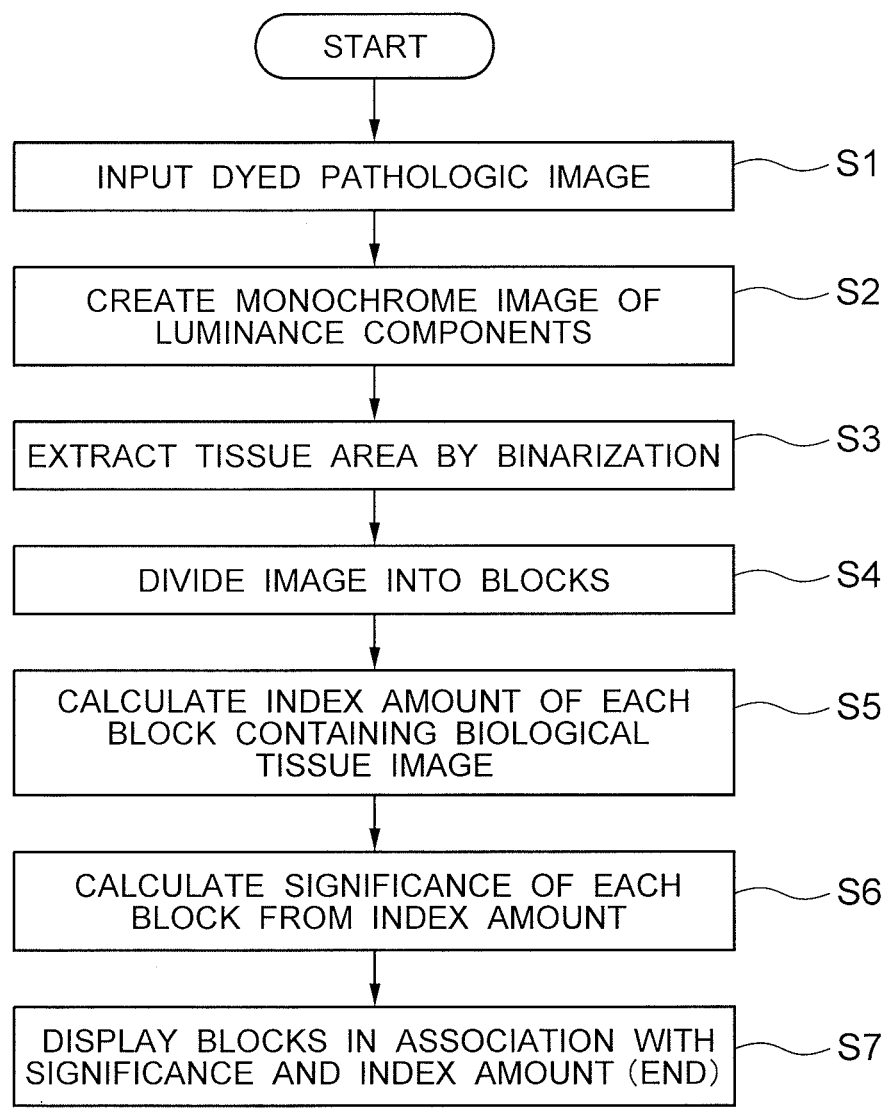
FIG. 10 is a flowchart showing entire operation processing steps of the pathologic image diagnostic system disclosed in FIG. 1.

Hereinafter, the actions of the pathologic image diagnostic system according to the first exemplary embodiment will be described in details based on a flowchart of FIG. 10.

First, the captured or scanned dye-processed pathologic image (original pathologic image) is inputted to the tissue extracting module 10 (step S1). From the pathologic image, the tissue extracting module 10 creates a monochrome image of luminance components of the pathologic image (step S2), extracts the tissue image area from the created monochrome image by using algorithm such as binarization of the Otsu criterion (step S3: a tissue area extracting function), and transmits it to the index amount calculating unit 20.

The index amount calculating unit 20 divides the original pathologic image and the corresponding binary image into blocks (rectangular blocks), respectively (step S4), calculates the index amounts of each image block containing the tissue image (step S5: an index amount calculating function), and transmits each block to the significance calculating module 30.

The significance calculating module 30 calculates the significance of each block by a mapping (function) which associates the index amounts and the significances from a single index amount or a plurality of index amounts (step S6: a significance calculating function).

The significance calculating module 30 outputs/display the pathologic image on a display unit such as a monitor set in advance based on the relevance information regarding each block of the original pathologic image and the significance information (step S7).

It is assumed here to output/display the image showing the relevancy between each of the blocks and the significance information as well as the index amount information.

Note that the execution contents of the tissue area extracting function, the index amount calculating function, and the significance calculating function may be put into a program and may be executed by a computer that is provided in advance to the pathologic image diagnostic apparatus 1.

It is also possible to employ a structure in which a tissue extracting device 100, an index amount calculating device 200, a significance calculating device 300, and an image display device 400*a*, which are the devices of the pathologic image diagnostic apparatus 1, the index amount calculating unit 20, the significance calculating module 30, and the image display device 40*a*, respectively, are connected via a communication line or the like.

Figure 7:
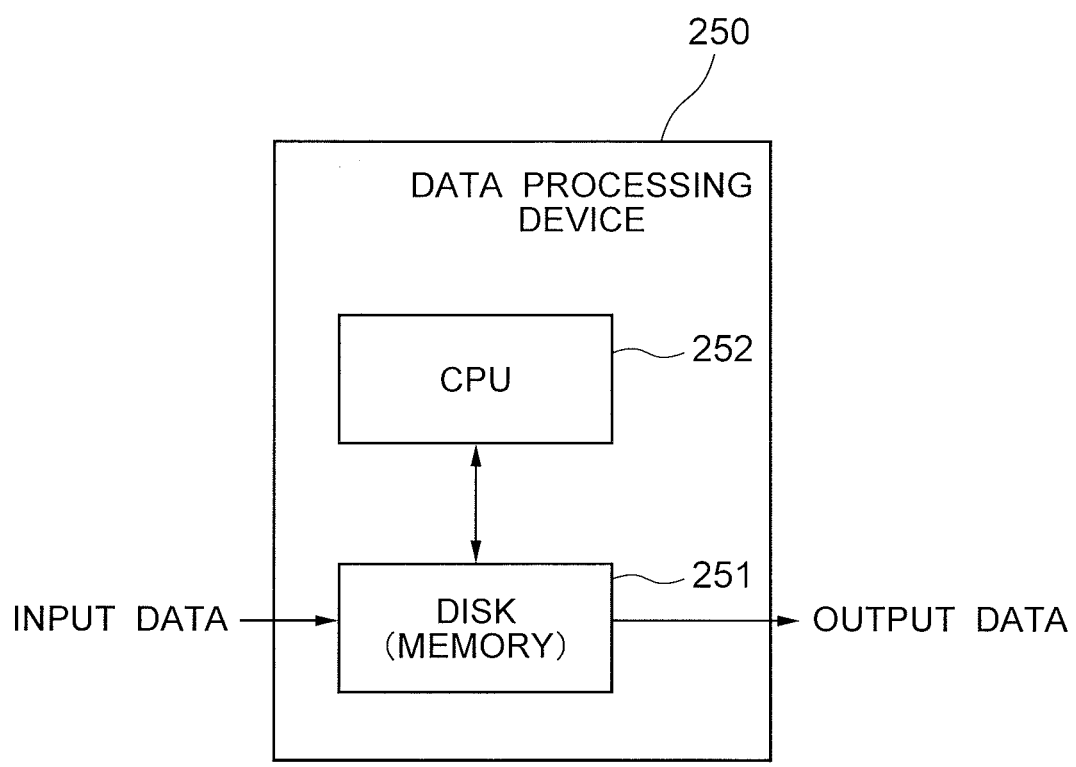
FIG. 7 is a schematic block diagram showing an exemplary embodiment of a data processing device of the pathologic image diagnostic system disclosed in FIG. 1.

Further, as a modification example of the structural contents of the first exemplary embodiment, it is also possible to employ a structure which includes: a data processing device 250 that is constituted with a storage device 251 such as a memory or a storage disk for storing the image data (blocks) inputted as input data, the index amount information, and the significance information; and an arithmetic operation unit 252 such as a CPU for extracting the tissue area of the image data (blocks) and calculating the index amounts and significances of each block, as shown in FIG. 7, instead of the structure constituted with the tissue extracting device 100, the index amount calculating units 2001, 2002, - - - constituting the index amount calculating device 200, and the significance calculating device 300 of the first exemplary embodiment.

Figure 8:
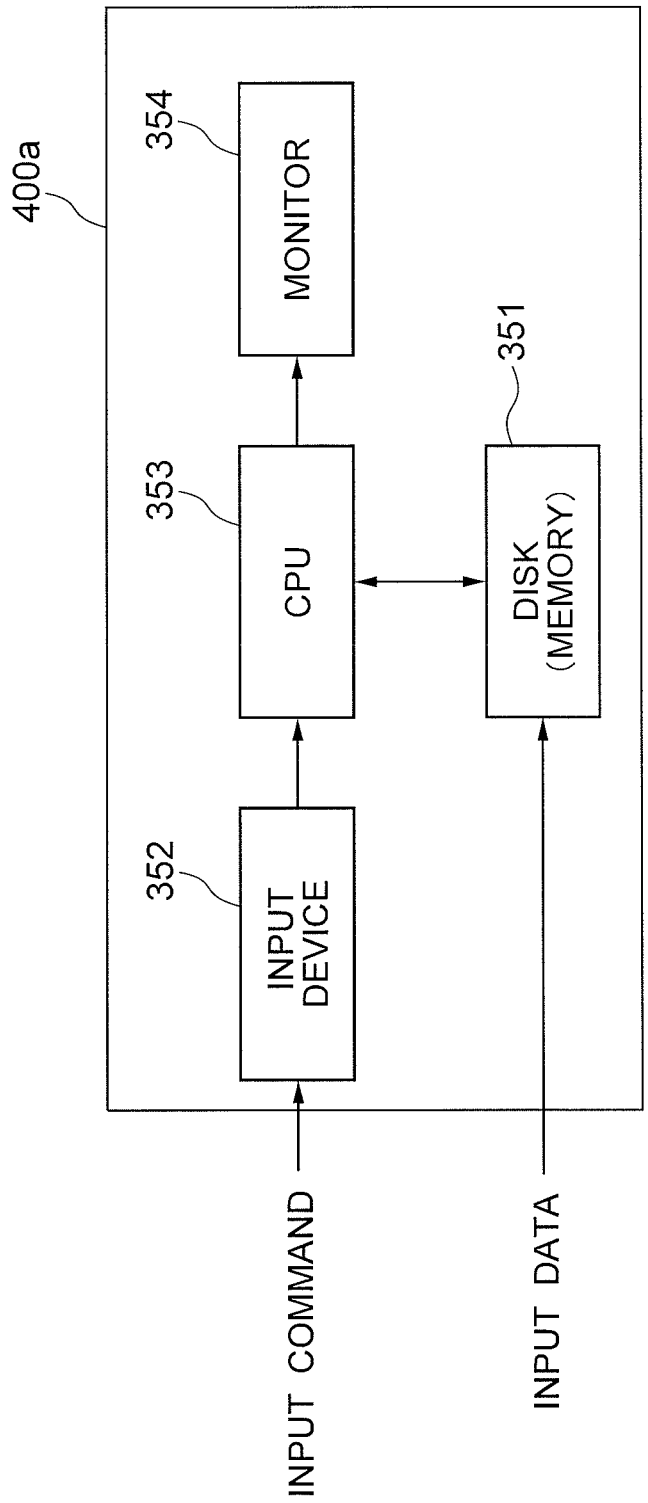
FIG. 8 is a schematic block diagram showing an exemplary embodiment of an image display device of the pathologic image diagnostic system disclosed in FIG. 1.

Further, as shown in FIG. 8, the image display device 400*a* may be structured to include: a storage device 351 such as a memory or a disk for storing input data containing the image information (block data), the significance information, the index value information sent from the significance calculating module 30; an input device 352 such as a keyboard or a pointing device for allowing a user to conduct input commands; a monitor 354 which outputs/displays the processing results acquired by a CPU 353; and an arithmetic operation device such as a CPU for calculating the result to be displayed on the monitor according to the input data and the input command.

Through employing such structures, the functions processed by the CPU set in the pathologic image diagnostic apparatus 1 can be allotted in a distributed manner to each of the arithmetic operation processing device 250 and the image display device 400*a*. Therefore, the processing load on the CPU in each device can be suppressed.

(Second Exemplary Embodiment)

Next, a pathologic image diagnostic system of a second exemplary embodiment according to the present invention will be described. Note here that the same reference numerals are applied to the same components as those of the first exemplary embodiment.

Figure 2:
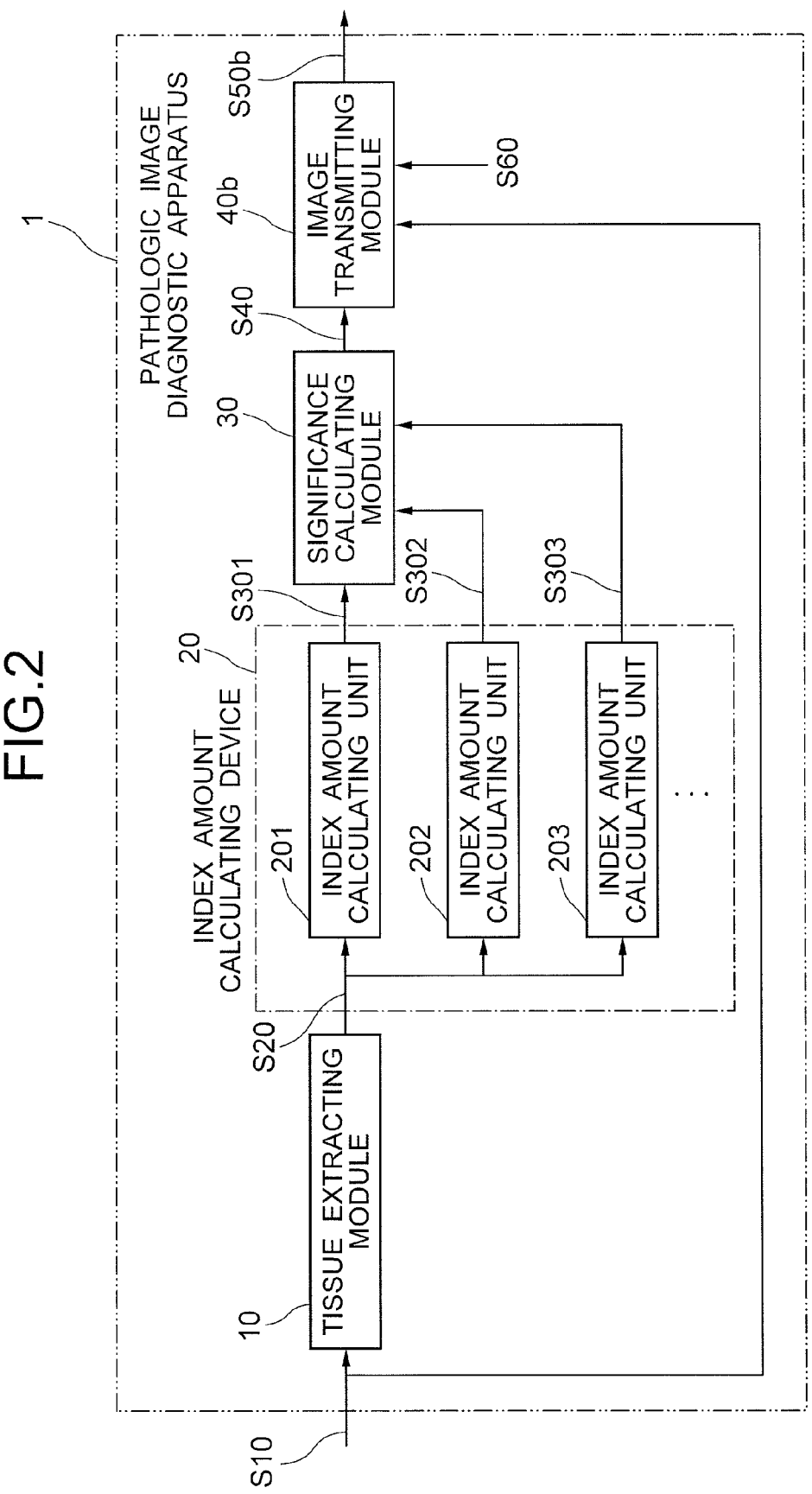
FIG. 2 is a schematic block diagram showing an exemplary embodiment of the pathologic image diagnostic system according to the present invention.

In the second exemplary embodiment, the device structural components of the system are almost the same as those of the first exemplary embodiment (FIG. 1) described above. As shown in FIG. 2, the second exemplary embodiment is different from the case of the first exemplary embodiment in respect that the second exemplary embodiment includes an image transmitting module 40*b* instead of the image displaying module 40*a* of the first exemplary embodiment (FIG. 1) and includes a reception-side terminal that is connected to the image transmitting module 40*b* via a communication line.

The image transmitting module 40*b* outputs (transmits) block data S50*b* to the communication line in order of the significance from the one with the highest order based on the significance order and index values S40 of the blocks sent from the significance calculating module 30 (a block outputting/transmitting function).

Further, when reception of the block data with the significance required on the reception side is completed, the image transmitting module 40*b* receives a stop request signal S60 from the reception-side terminal, and stops transmission of the block data based on the stop request signal S60 (a data transmission stop function).

Note that the tissue extracting module 10, the index amount calculating module 20, and the significance calculating module 30 of the second exemplary embodiment operate in the same manner as the case of the first exemplary embodiment (FIG. 1) described above.

(Explanation of Action of Second Exemplary Embodiment)

Figure 11:
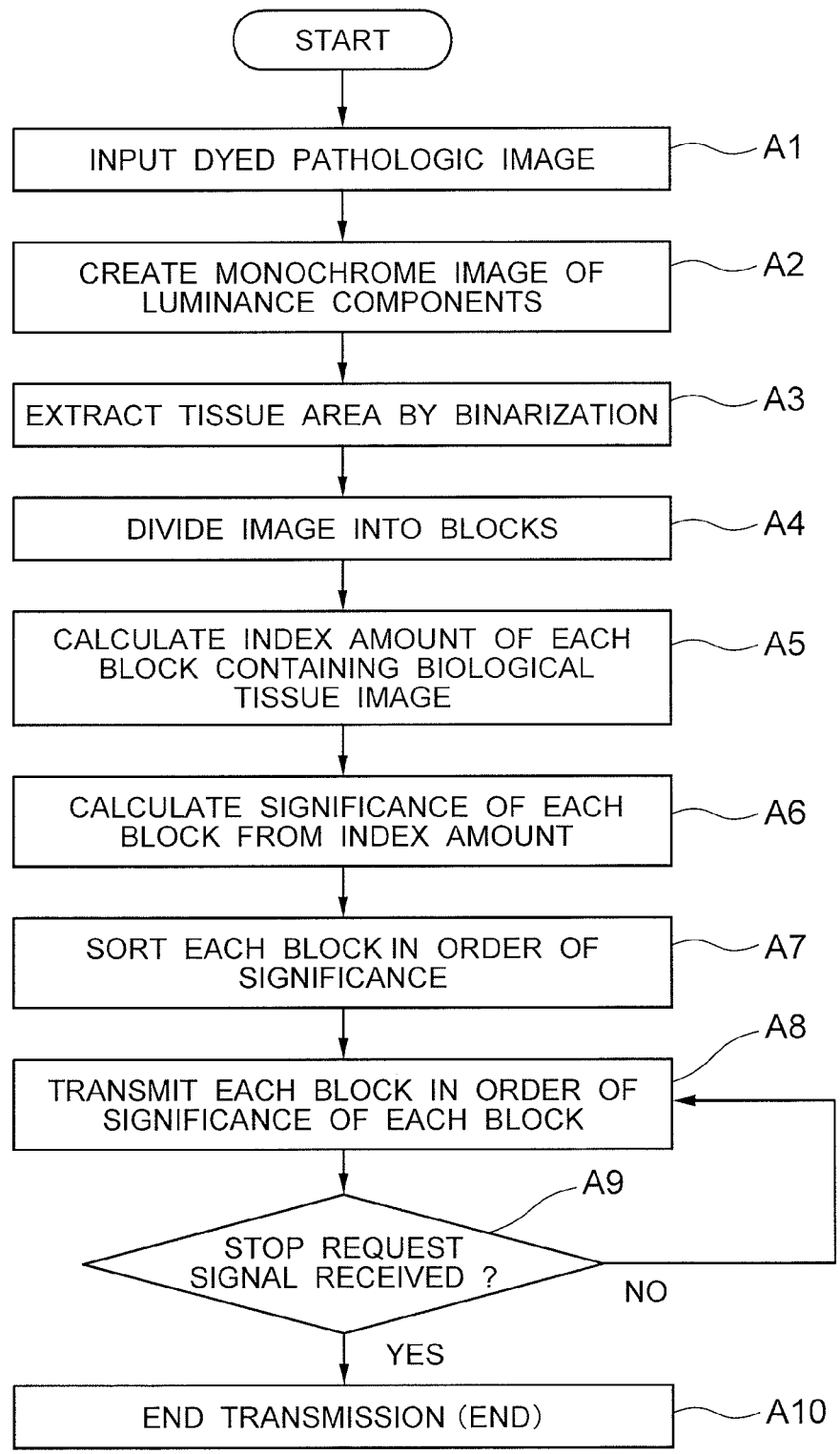
FIG. 11 is a flowchart showing entire operation processing steps of the pathologic image diagnostic system disclosed in FIG. 2.

Next, actions of the pathologic image diagnostic system according to the second exemplary embodiment will be described by referring to a flowchart of FIG. 11.

First, the captured or scanned dye-processed pathologic image is inputted to the tissue extracting module 10 (step A1). From the pathologic image, the tissue extracting module 10 creates a monochrome image of luminance components of the pathologic image (step A2), extracts the tissue image area roughly from the created monochrome image by using algorithm such as binarization of the Otsu criterion (step A3: a tissue area extracting function), and transmits it to the index amount calculating unit 20.

Prior to the tissue area extracting function, a blurring filter may be employed for suppressing an influence of noises outside the tissue area.

The index amount calculating unit 20 divides the original pathologic image and the corresponding binary image into blocks (rectangular blocks), respectively (step A4), calculates the index amounts of each image block containing the tissue image (step A5: an index amount calculating function), and transmits each block to the significance calculating module 30.

The significance calculating module 30 calculates the significance of each block by a mapping (function) which associates the index amounts and the significances from a single index amount or a plurality of index amounts (step A6: a significance calculating function).

Further, the significance calculating module 30 sorts the blocks in order of the calculated significances from the highest one (step A7), and transmits those to the image transmitting module 40b.

The image transmitting module 40b adds the significance information to each block data, and transmits the block data in order of the significance from the highest one to the reception-side terminal (step A8).

After receiving the block data of the required significance, the reception side transmits a stop request signal for requesting to stop transmission of the block data to the image transmitting module 40b as the transmission side.

When receiving the stop signal (step A9: YES), the image transmitting module 40b stops transmission of the encoded block data (step A10: ends transmission).

Note that the execution contents of the tissue area extracting function, the index amount calculating function, and the significance calculating function may be put into a program and may be executed by a computer that is provided in advance to the pathologic image diagnostic apparatus 1.

Further, as a modification example of the structural contents of the second exemplary embodiment, it is also possible to employ a structure which includes: a data processing device 250 that is constituted with a storage device 251 such as a memory or a storage disk for storing the image data (blocks), the index amount information, and the significance information; and an arithmetic operation unit 252 such as a CPU for extracting the tissue area of the image data (blocks) and calculating the index amounts and significances of each block, as shown in FIG. 7, instead of the structure constituted with the tissue extracting device 100, the index amount calculating units 2001, 2002, - - - constituting the index amount calculating device 200, and the significance calculating device 300 of the second exemplary embodiment.

Figure 9:
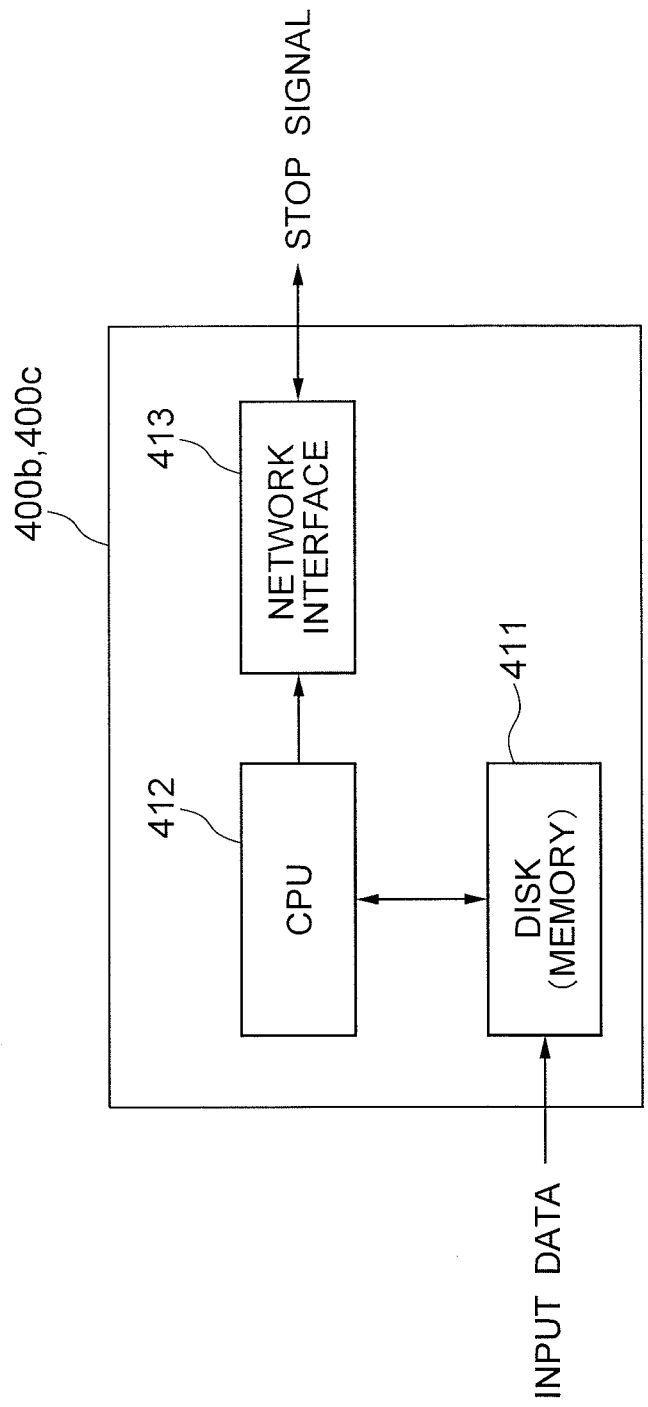
FIG. 9 is a schematic block diagram showing an exemplary embodiment of an image transmission device (an area encoding device) of the pathologic image diagnostic system disclosed in FIG. 2 and FIG. 3.

Further, as shown in FIG. 9, the image transmission device 400b may be structured to include: a storage device (disk memory 411) such as a memory or a disk for loading and temporarily storing input data containing the image information (block data), the significance information, the index value information sent from the significance calculating module 30; a CPU 412 which determines the block to be transmitted based on the values of the significance information from the block data loaded to the disk memory 411 and performs processing for cutting out the block from the image information; and a network interface 413 which transmits the cutout image (block) to a network as a bit stream and receives a stop request signal sent from the reception device under a control of the CPU 412 by being connected to a communication line.

The CPU 412 and the network interface 413 of the second exemplary embodiment execute transmission of the block data (blocks) from the one with the highest significance order in the manner as described above.

Through employing such structures, the functions processed by the CPU set in the pathologic image diagnostic apparatus 1 can be allotted in a distributed manner to each of the arithmetic operation processing device 250 and the image display device 400b. Therefore, the processing load on the CPU in each device can be suppressed.

(Third Exemplary Embodiment)

Next, a pathologic image diagnostic system of a third exemplary embodiment according to the present invention will be described. Note here that the same reference numerals are applied to the same components as those of the first exemplary embodiment.

Figure 3:
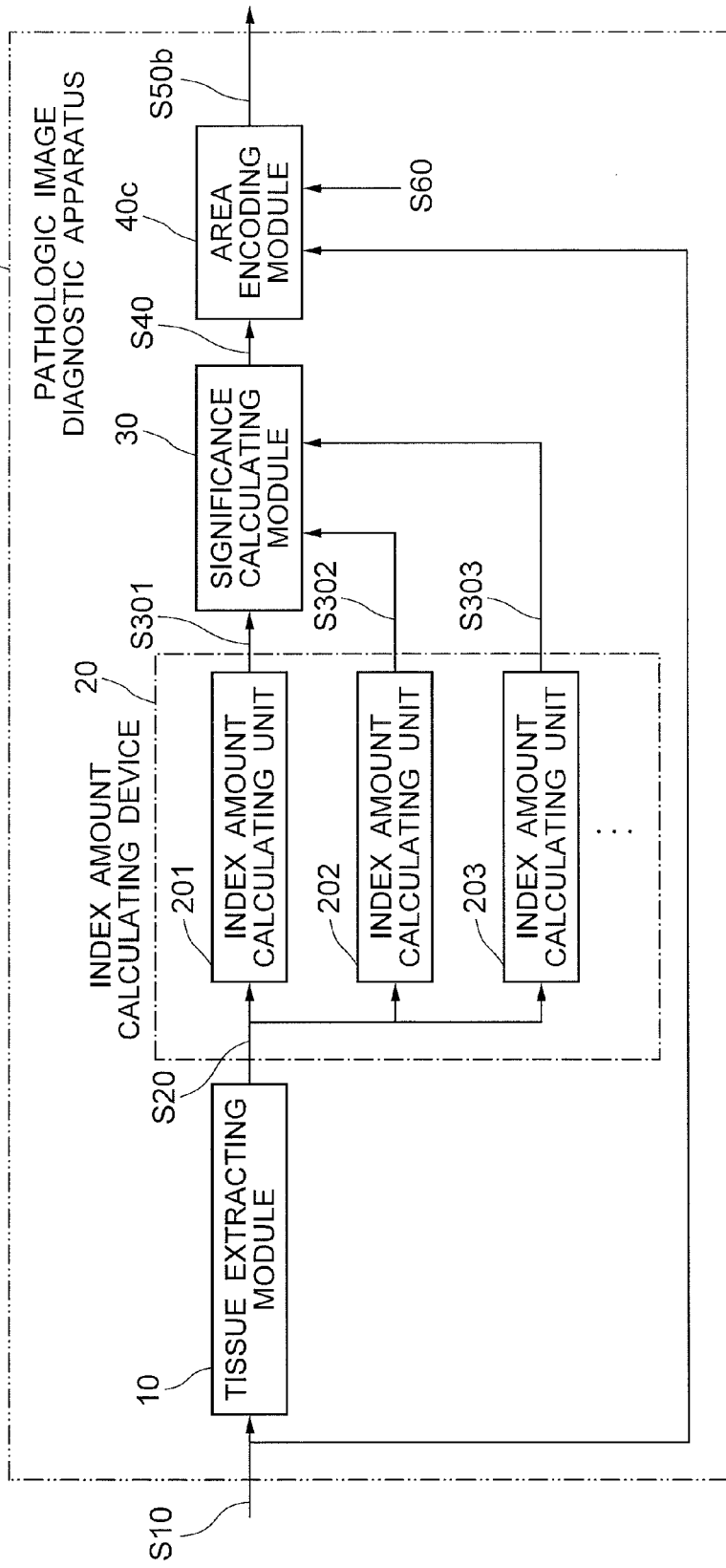
FIG. 3 is a schematic block diagram showing an exemplary embodiment of the pathologic image diagnostic system according to the present invention.

In the third exemplary embodiment, the device structural components of the system are almost the same as those of the first exemplary embodiment (FIG. 1) described above. As shown in FIG. 3, the third exemplary embodiment is different from the case of the first exemplary embodiment in respect that the third exemplary embodiment includes an area encoding device 40c instead of the image displaying module 40a of the first exemplary embodiment (FIG. 1) and includes a reception-side terminal that is connected to the image transmitting module 40b via a communication line.

The area encoding module 40c performs different encoding on each block data by each block based on the order of the blocks (data) and the index values S40 sent from the significance calculating module 30 (a block encoding function).

For the block with a higher significance out of the sent blocks, performed is reversible encoding with which the image can be restored to the original image completely.

Further, the area encoding module 40c performs encoding with a higher compression rate through increasing the compression rate by corresponding to the significances as the significances of the sent blocks become lower (a function) to decrease the data amount (transmission data amount) of the encoded blocks.

Furthermore, the area encoding module 40c transmits encoded block data S50c to the reception side, receives a stop signal 60 from the reception side (terminal) when reception of the encoded block data with the high significance required to be transmitted is all completed on the reception side, and stops transmission of the encoded block data (a data transmission stop function).

(Explanation of Action of Third Exemplary Embodiment)

Next, actions of the pathologic image diagnostic system according to the third exemplary embodiment will be described by referring to a flowchart of FIG. 12.

First, the captured, scanned, and dye-processed pathologic image is inputted to the tissue extracting module 10 (step B1). From the pathologic image, the tissue extracting module 10 creates a monochrome image of luminance components of the pathologic image (step B2), extracts the tissue image area roughly from the created monochrome image by using algorithm such as binarization of the Otsu criterion (step B3: a tissue area extracting function), and transmits it to the index amount calculating unit 20.

Prior to the tissue area extracting function, a blurring filter may be employed for suppressing an influence of noises outside the tissue area.

The index amount calculating unit 20 divides the original pathologic image and the corresponding binary image into blocks (rectangular blocks), respectively (step B4), calculates the index amounts of each image block containing the tissue image (step B5: an index amount calculating function), and transmits each block to the significance calculating module 30.

The significance calculating module 30 calculates the significance of each block by a mapping (function) which associates the index amounts and the significances from a single index amount or a plurality of index amounts (step B6: a significance calculating function).

Further, the significance calculating module 30 sorts the blocks in order of the calculated significances from the highest one (step B7), and transmits those to the area encoding module 40c.

The area encoding module 40c performs encoding on each block by changing the compression rate according to the significance of each block in the sorted order (step B8).

Then, the area encoding module 40c adds the significance information to the encoded block data, and transmits it to the reception side (step B9).

After receiving the block data of the required significance, the reception side transmits a stop request signal for requesting to stop transmission of the block data to the area encoding module 40c as the transmission side.

When receiving the stop signal (step B10: YES), the area encoding module 40c stops transmission of the encoded block data (step B11: completion of transmission).

Note that the execution contents of the tissue area extracting function, the index amount calculating function, and the significance calculating function may be put into a program and may be executed by a computer that is provided in advance to the pathologic image diagnostic apparatus 1.

Further, as a modification example of the structural contents of the third exemplary embodiment, it is also possible to employ a structure which includes: an arithmetic operation processing device 250 that is constituted with a storage device 251 such as a memory or a storage disk for storing the image data (blocks), the index amount information, and the significance information; and an arithmetic operation unit 252 such as a CPU for extracting the tissue area of the image data (blocks) and calculating the index amounts and significances of each block, as shown in FIG. 7, instead of the structure constituted with the tissue extracting device 100, the index amount calculating units 2001, 2002, - - - constituting the index amount calculating device 200, and the significance calculating device 300 of the third exemplary embodiment.

Further, as shown in FIG. 9, as in the case of the image transmission device 400b, the area encoding device 400c may be structured to include: a storage device (disk memory 411) such as a memory or a disk for loading and temporarily storing input data containing the image information (block data), the significance information, the index value information sent from the significance calculating module 30; a CPU 412 which determines the block to be transmitted based on the values of the significance information from the block data loaded to the disk memory 411 and performs processing for cutting out the block from the image information; and a network interface 413 which transmits the cutout image (block) to a network as a bit stream and receives a stop request signal sent from the reception device under a control of the CPU 412 by being connected to a communication line.

The arithmetic operation device 412 such as the CPU of the third exemplary embodiment is designed to perform encoding of the image data between cutout of a block and making it into a bit stream, and to change the compression rate thereof at that time according to the significance of the block.

Thereby, the functions processed by the CPU set in the pathologic image diagnostic apparatus 1 can be allotted in a distributed manner to each of the arithmetic operation processing device 250 and the area encoding device 400c. Therefore, the processing load on the CPU in each device can be suppressed.

While the present invention has been described heretofore by referring to the embodiments (and EXAMPLES), the present invention is not limited only to the embodiments (and EXAMPLES). Various changes and modifications occurred to those skilled in the art can be applied to the structures and details of the present invention without departing from the scope of the present invention.

This Application claims the Priority right based on Japanese Patent Application No. 2009-134219 filed on Jun. 3, 2009 and the disclosure thereof is hereby incorporated by reference in its entirety.

Industrial Applicability

The present invention can be applied to a system which supports pathologic image diagnoses conducted between remote areas and image diagnoses related to telemedicine.

Reference Numerals
- 1 Pathologic image diagnostic apparatus (pathologic image diagnostic system)
- 10 Tissue extracting module
- 20 Index amount calculating unit
- 30 Significance calculating module
- 201, 202, 203, - - - Index calculating unit
- 250 Data processing device
- 251, 351, 411 Disk memory
- 252, 353, 412 CPU (central processing unit)
- 354 Monitor
- 400a Image display device
- 400b Image transmission device
- 400c Area encoding device
- 413 Network interface

The invention claimed is:

1. A pathologic image diagnostic system, comprising:
   a measurement index setting module which divides a pathologic image where a biological tissue is captured into preset divisional areas and sets preset measurement index values regarding a reference of a pathologic diagnosis for each of the divisional areas;
   a significance setting module which sets a significance regarding a pathologic measurement to each of the divisional areas based on the measurement index values of each of the divisional areas and the measurement index values of the divisional areas neighboring to each of the measurement areas;
   a divisional area extracting module which extracts the divisional area in which an area of captured biological tissue occupies a specific proportion from the divisional areas and transmits the divisional area by associating it with the measurement index values and the divisional significance; and
   a divisional area output/display module which outputs/displays the pathologic image constituted with the transmitted divisional area.

2. The pathologic image diagnostic system as claimed in claim 1, wherein
   when the biological tissue in the pathologic image is dye-processed by a preset specific color, the measurement index setting module has a color concentration index value setting function which sets the measurement index values regarding the pathologic diagnosis based on a preset concentration amount of the specific color.

3. The pathologic image diagnostic system as claimed in claim 1, wherein
   the measurement index setting module has a Laplacian extracting function which extracts an image feature of the divisional area by calculating the Laplacian between the divisional areas, and extracts a block containing the biological tissue based on a result of the extraction.

4. The pathologic image diagnostic system as claimed in claim 1, wherein
   the measurement index setting module has a moment extracting function which extracts a block containing the biological tissue through extracting an image feature based on moment of neighboring divisional areas.

5. The pathologic image diagnostic system as claimed in claim 1, wherein
the divisional area extracting module has a significance order transmitting function which transmits the divisional areas in order from the area with a higher order in terms of the set significance values.

6. The pathologic image diagnostic system as claimed in claim 1, wherein
the divisional area extracting module includes a divisional area compressing function which encodes the divisional area with a higher value of the set significance by a lower compression rate, and encodes the divisional area with a lower value of the set significance by a higher compression rate.

7. A pathologic image diagnostic method, comprising:
dividing a pathologic image where a biological tissue is captured into preset divisional areas and setting preset measurement index values regarding a reference of a pathologic diagnosis for each of the divisional areas;
setting a significance regarding a pathologic measurement to each of the divisional areas based on the measurement index values of each of the divisional areas and the measurement index values of the divisional areas neighboring to each of the measurement areas;
extracting the divisional area in which an area of captured biological tissue occupies a specific proportion from the divisional areas and transmitting the divisional area by associating it with the measurement index values and the divisional significance; and
outputting/displaying the pathologic image constituted with the transmitted divisional area.

8. A non-transitory computer readable recording medium storing a pathologic image diagnostic program which causes a preset computer to execute:
a function which divides a pathologic image where a biological tissue is captured into preset divisional areas and calculates measurement index values regarding a reference of a pathologic diagnosis for each of the divisional areas;
a function which sets a significance regarding a pathologic measurement to each of the divisional areas based on the measurement index values of each of the divisional areas and the measurement index values of the divisional areas neighboring to each of the measurement areas; and
a function which extracts the divisional area in which an area of captured biological tissue occupies a specific proportion from the divisional areas.

9. A pathologic image diagnostic system, comprising:
measurement index setting means for dividing a pathologic image where a biological tissue is captured into preset divisional areas and setting preset measurement index values regarding a reference of a pathologic diagnosis for each of the divisional areas;
significance setting means for setting a significance regarding a pathologic measurement to each of the divisional areas based on the measurement index values of each of the divisional areas and the measurement index values of the divisional areas neighboring to each of the measurement areas;
divisional area extracting means for extracting the divisional area in which an area of captured biological tissue occupies a specific proportion from the divisional areas and transmitting the divisional area by associating it with the measurement index values and the divisional significance; and
divisional area output/display means for outputting/displaying the pathologic image constituted with the transmitted divisional area.

* * * * *